Figure 1:
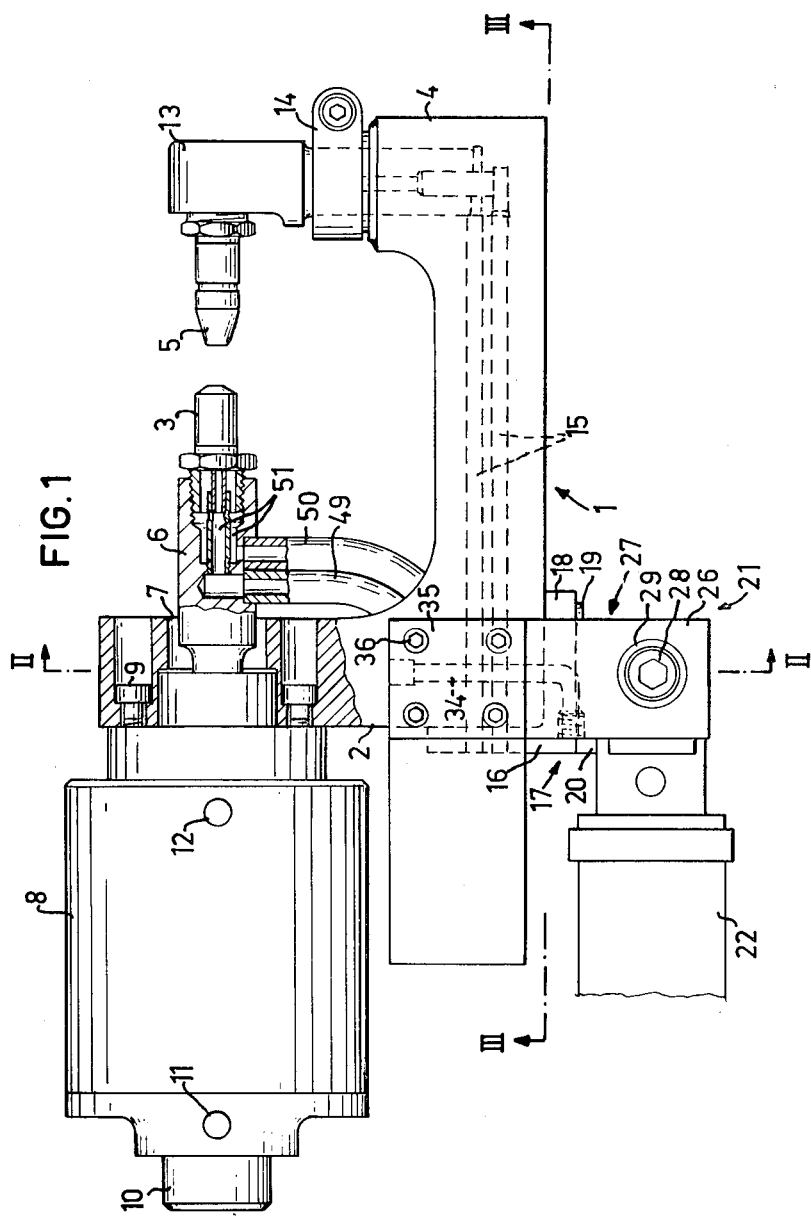

United States Patent [19] [11] 4,208,566
Eghammer et al. [45] Jun. 17, 1980

[54] SPOT WELDING DEVICE
[75] Inventors: Lars E. Eghammer, Olofström; Sven-Olof Ohlsson, Svängsta, both of Sweden
[73] Assignee: AB Volvo, Gothenburg, Sweden
[21] Appl. No.: 925,685
[22] Filed: Jul. 18, 1978
[51] Int. Cl.² ............................................. B23K 11/10
[52] U.S. Cl. ................................ 219/86.1; 219/86.31; 219/87; 219/89
[58] Field of Search ................ 219/87, 89, 86.1, 86.31
[56] References Cited
U.S. PATENT DOCUMENTS
3,205,337  9/1965  Hiemewz ................................ 219/87

Primary Examiner—E. A. Goldberg
Attorney, Agent, or Firm—Young & Thompson

[57] ABSTRACT

A C-shaped spot welding gun has its movable electrode extending from one arm of the gun's C-yoke. An air cylinder for moving the electrode is attached on the opposite side of the arm. A package of parallel copper strips is bent to U-shape and surrounds the arm below the air cylinder. One end of the U-shaped flexible conductor thus formed is attached to a fixed current connection member on one side of said arm, whereas the other conductor end is attached to a movable current connection member slidable in a guide on an opposite, parallel side of the arm. The movable current connection member is carried by the moving electrode by means of current conducting coolant pipes.

5 Claims, 4 Drawing Figures

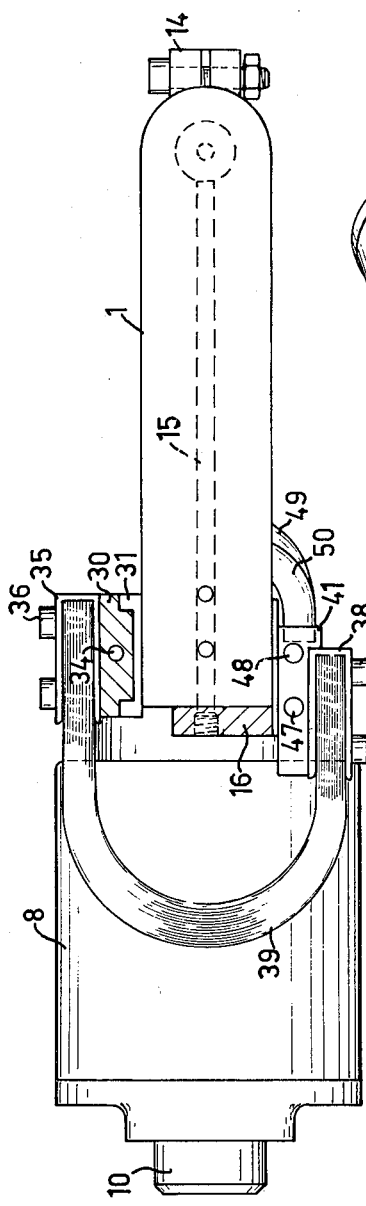
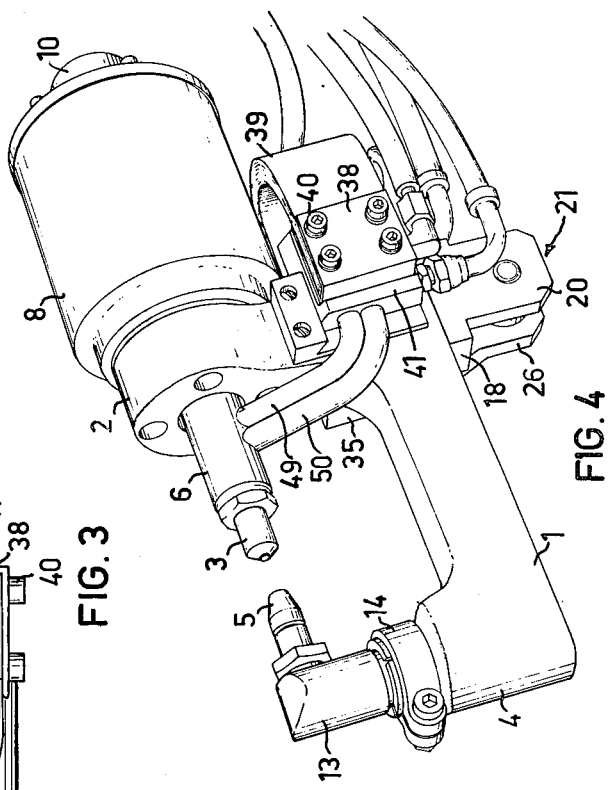

SPOT WELDING DEVICE

The present invention relates to an electric resistance welding apparatus comprising a movable electrode carried by an arm of the device, means for moving said electrode with respect to said arm, and a flexible current conductor extending between a fixed current connection member electrically connected with a current source and movable current connection member rigidly connected to the movable electrode for movement therewith.

A primary demand placed on such welding apparatus is that holder devices for moving welding electrodes permit good access to the work piece. This means that the holder itself must not be too bulky, especially not in the vicinity of the tip of the electrode, and that the supply means, such as power supply lines and coolant tubes, must not present obstacles in the work area. Furthermore the holder must be rigid so that a high pressure can be applied to the work piece by means of the electrode. Finally the weight must be kept as low as possible, especially in spot welding guns for manual use or for use in automated machinery.

The purpose of the present invention is to develop a welding device of the above-mentioned type which fulfills the above requirements to a greater degree than previously. According to the invention this is achieved with a welding device which is characterised in that the fixed current connection member is rigidly attached to a first side of said arm, that the movable current connection member is movably arranged on a second side of said arm, that said second arm side is substantially parallel with a plane passing through said arm and the axis of movement of the movable electrode, and that the current conductor extends from the movable current connection member in a direction parallel with the axis of movement of the movable electrode and is flexible in a plane perpendicular to said plane.

The flexible conductor is preferably U-shaped and makes a loop backwards from and surrounding the arm, looking towards the tip of the welding electrode. Thus it takes up very little space and does not encroach on the work space at all. Alternatively, the conductor can be made L-shaped with one leg being joined to the side of the arm facing away from the electrode. With the U-shape the conductor has a greater length and radius of curvature, thus withstanding flexural stresses and electrical repulsing phenomena better.

According to a preferred embodiment of the invention, the movable current connection member is carried by a holder intended for the movable electrode and movable therewith in a guide on the arm.

According to a further embodiment of the invention, the movable current connection member is rigidly joined to the moving electrode via at least one coolant connection constructed as an electrically conducting rigid pipe. Suitably, two parallel or concentric pipes can be arranged for feeding and returning coolant to and from the electrode. These pipes have a threefold function: one, to conduct the coolant; to, to conduct current to the electrode; and three, forming a rigid mechanical connection between the electrode and the current conducting device. The guiding of said device and the movable end of the flexible conductor is thus quite simple. If, as according to a preferred embodiment of the invention, the current conductor consists of parallel, longitudinal, thin metal strips arranged in a package with the width perpendicular to the plane of the U-shape, the guide can consist, quite simply, of a guide body, preferably of electrically insulating material, with a guide groove running parallel to the longitudinal axis of the moving electrode and opening in a direction away from said longitudinal axis. The movable current connection member has a ridge, engaging in the guide groove and situated on the edge of the movable leg of the conductor lying closest to the moving electrode and parallel thereto. Such a flexible conductor is rigid perpendicular to the plane of the U-shape, thus making the guide for its movable end quite simple and slender by virtue of the fact that said end is held at the same time by the moving electrode.

Figure 2:
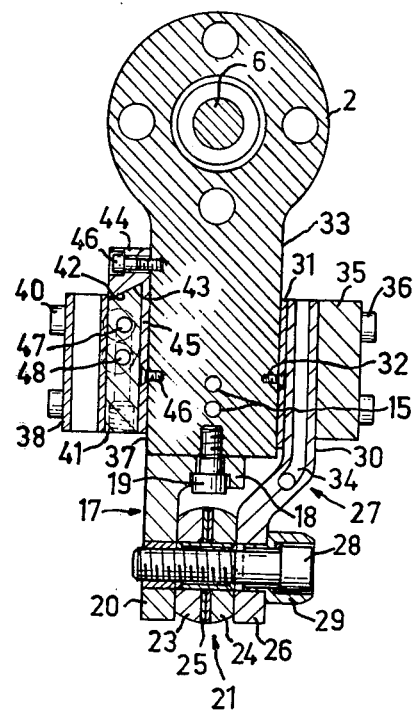

One embodiment of the invention in the form of a C-shaped spot welding gun is described below in detail with reference to the accompanying drawings, of which FIG. 1 shows from the side and partially in section the spot welding gun according to the invention, FIG. 2 shows a section along the line II—II in FIG. 1, FIG. 3 shows a section along the line III—III in FIG. 1, and FIG. 4 shows the welding gun in perspective.

The welding gun shown in the drawings is constructed around a C-shaped yoke 1, one arm 2 of which carries the moving electrode 3 and the other arm 4 of which carries the stationary electrode 5. The moving electrode 3 is disposed in a holder 6 which extends through an opening 7 in the arm 2 and extends with its end directed away from the electrode into an air cylinder 8. The air cylinder is fastened by means of screws 9 to the side of the arm 2 facing away from the electrode 3 and its piston is joined (in a way not shown in more detail here) to the electrode holder 6. The end of the cylinder 8 facing away from the arm 2 has a pin 10, by means of which the welding gun is mounted in automated machinery or onto which a handle is attached for manual operation of the welding gun. The air connections of the cylinder 8 are designated 11 and 12.

The stationary electrode 5 is mounted in an angular holder 13 which is secured in the arm 4 by means of a clamping ring 14. The electrode 5 is water-cooled and the coolant is fed to the electrode holder 13 by internal connections 15 (shown with dashed lines in FIGS. 1 and 3) in the yoke 1. The connections 15 extend through the rear wall of the arm 2 to a leg 16 of a connecting plate 17 with three legs. A second leg 18 of this plate 17 is screwed, with screws 19, onto the underside of the yoke 1 at its arm 2. A third leg 20 of the connecting plate 17 extends downwards from the yoke 1 and forms one half of a connecting clamp 21 for clamping an electrical two-conductor cable 22 for supplying current to the welding gun. One terminal 23 of the cable end is in contact with the leg 20. Current is supplied to the stationary electrode 5 via the leg 20 and the leg 16 connected therewith in the connecting plate 17, then through the yoke 1 and the arm 4 and finally through the electrode holder 13.

The other conductor of the electric cable 22 has a cable terminal 24 which is separated from the first-mentioned cable terminal 23 by an insulating plate 25 (see FIG. 2). The second cable terminal 24 abuts the other half of the connecting clamp 21 which is the lower leg 26 of the second connecting plate 27. A clamping screw 28 goes through a hole in leg 26 and is screwed into the leg 20 of the first-mentioned connecting plate 17. The head of the screw 28 is insulated from leg 26 by an insulating bushing 29.

The connecting plate 27 extends upwards from leg 26 and is curved outwards and then upwards again, so that the upper leg 30 of the plate 27 is parallel to the lower leg 26 but at a greater distance from the center plane of the welding gun than said lower leg. An insulating layer 31 is attached by countersunk screws 32 (FIG. 2) to the flat surface 33 of the arm 2 at its transition into the middle section of the yoke 1. The screw 28 presses the upper leg 30 of the connecting plate 27 against the insulating layer 31. The connecting plate 27 is provided with a coolant duct 34, extending from the upper short side of the leg 30 down to a rearwardly facing opening on the long side of the connecting plate 27 at the transition between legs 26 and 30.

A connecting sleeve 35 is attached by means of screws 36 to the outside of the leg 30. The connecting sleeve 35 is mounted around the ends of a package of thin adjacent flat copper strips. These are bent in a U-shape and extend from the connecting sleeve 35, parallel to the yoke 1 in the direction from its forward arm 4, around its rear arm 2 beneath the compressed air cylinder 8 and again parallel to the yoke 1 near the opposite side 37 of the arm 2 where the ends of the copper strips are bound by a second connecting sleeve 38. The copper strips form a flexible conductor 39 by virtue of the fact that the copper strips do not abut one another but are spaced with air in-between them in the curved section of the package. The connecting sleeve 38 is secured with screws 40 to a connecting plate 41, the upper edge 42 of which according to FIG. 2 is obliquely cut so that it is inclined downwards and outwards from the longitudinal center plane of the welding gun. By means of this edge 42, the connecting plate 41 is guided in a guide 43 in the form of a groove opening obliquely downwards and outwards according to FIG. 2 in a guide body 44 made of insulating material. The guide body 44 has an insulating sheet 45 along the side 37 of the arm, which insulates the connecting plate 41 from the yoke 1, and the guide body 44 is secured to the side 37 by countersunk screws 46.

The lower edge of the connecting plate 41, lying opposite to the bevelled edge 42, has two connecting openings for coolant. Two coolant ducts 47 and 48 extend at an angle through the connecting plate 41 to openings in its forward end edge. A copper pipe 49 and 50, respectively, is soldered onto each opening. These copper pipes are bent at an angle upwards and run parallel to one another to the coolant connections in the moving electrode holder 6 in which they are soldered. The pipes are connected in a known manner with coolant ducts 51 (FIG. 1) arranged in the electrode holder 6 and the electrode 3. The pipes 49 and 50 are soldered together along their entire length between the connecting plate 41 and the electrode holder 6.

Thus current is supplied to the moving electrode 3 from cable terminal 24 via legs 26 and 30 of the connecting plate 27, the connecting sleeve 35, the flexible conductor 39, the connecting sleeve 38, the connecting plate 41 and the coolant pipes 49,50. The connecting plates at both ends of the flexible conductor 39 are cooled and the copper strips in the curved section of the conductor 39 are spaced so that air cooling is obtained. The movable connecting plate 41 can be guided very simply by virtue of the fact that it can only move in the plane of the U-shape formed by the conductor 39; i.e. because a package of flat copper strips is used as a conductor, it cannot be bent transversely to the plane of the U. The guiding of the movable connecting plate 41 is effected by pressing it up against the V-shaped guide groove 43 with the aid of the current-conducting coolant pipes 49,50 which are rigidly joined to the electrode holder 6, which is in turn guided in the cylinder 8.

In operation, the welding gun is mounted by the pin 10 and is moved to the spot to be welded, so that the electrodes 3 and 5 are on opposite sides thereof with the stationary electrode 5 abutting the spot to be welded. Then compressed air is supplied through the connection 11 to the cylinder 8, projecting the electrode holder 6 until the electrode 3 is pressed against the welding spot. During this movement, the coolant pipes 49,50 move the connecting plate 41 in the guide groove 43, bending the conductor 39 beneath the cylinder 8. Then the electrodes 3 and 5 are supplied with current for a short time from the current supply cable 22 along the paths described above so that a spot weld is created. Finally the load is taken off the compressed-air cylinder 8, and the electrode holder 6 returns to the position shown in the drawings, the coolant pipes 49,50 also returning the movable connecting plate 41 and the conductor 39 to the starting position. The welding gun can then be moved to the next spot to be welded, and the sequence is repeated.

What we claim is:

1. An electric resistance welding device comprising a movable electrode (3) carried by an arm (2) of the device, means (6,8) for moving said electrode (3) with respect to said arm, and a flexible current conductor (39) extending between a fixed current connection member (30) electrically connected with a current source and movable current connection member (41) rigidly connected to the movable electrode (3) for movement therewith, characterized in that the fixed current connection member (30) is rigidly attached to a first side (33) of said arm (2); that the movable current connection member (41) is movably arranged on a second side (37) of said arm; that said second arm side (37) is substantially parallel with a plane passing through said arm (2) and the axis of movement of the movable electrode; and that the current conductor (39) extends from the movable current connection member (41) in a direction parallel with the axis of movement of the movable electrode (3) and is flexible in a plane perpendicular to said plane.

2. A device as claimed in claim 1, characterized in that said first and second arm sides (33,37) are mutually parallel, and that the current conductor (39) is U-shaped and surrounds the side of the arm (2) facing away from the electrode (3).

3. A device as claimed in claim 1 or 2, characterized in that the movable current connection member (41) is carried by a holder (6) intended for the movable electrode (3) and movable therewith, the current connection member (41) being movable in a guide (43) on said arm (2).

4. A device as claimed in claim 3, characterized in that the movable current connection member (41) is rigidly joined to the moving electrode (3) by means of at least one coolant duct in the form of an electrically conducting, rigid pipe (49,50).

5. A device as claimed in claim 3, characterized in that the conductor (39) consists of parallel, elongated, thin metal strips arranged in a package with its width perpendicular to the plane of the U-shape; that the guide comprises a guide body (44), preferably made of electrically insulating material, with a guide groove (43) running parallel to the longitudinal axis of the moving electrode (3) and opening in the direction away from said axis; and that the movable current connection member (41) has a rigid (42) engaging in the guide groove (43) and situated on the edge of the movable leg of the conductor (39) lying closest to the moving electrode (3) and parallel thereto.

* * * * *